May 15, 1962 G. F. ANDERSON 3,034,353
OMNI-DIRECTIONAL PRESSURE PROBE
Filed July 24, 1959
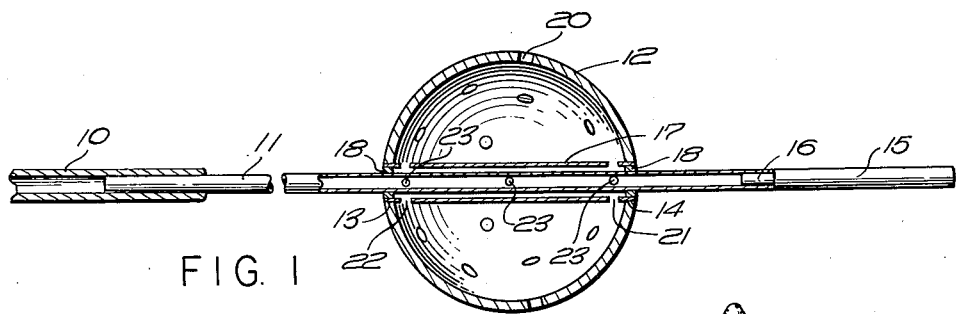
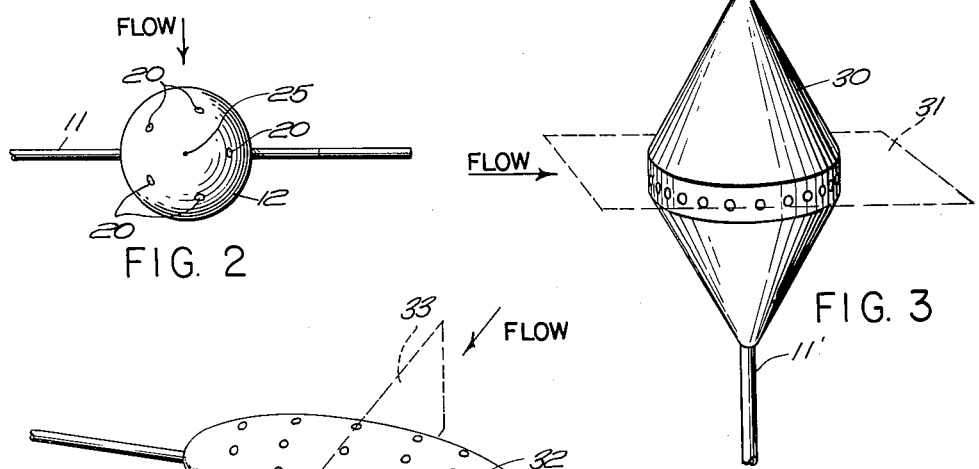
INVENTOR.
GORDON F. ANDERSON
BY
Barlow & Barlow
ATTORNEYS United States Patent Office 3,034,353
Patented May 15, 1962

3,034,353
OMNI-DIRECTIONAL PRESSURE PROBE
Gordon F. Anderson, 157 Mercer St.,
East Providence, R.I.
Filed July 24, 1959, Ser. No. 829,348
2 Claims. (Cl. 73—212)

This invention relates to a probe which will obtain a static pressure within a flowing fluid such as air. It is necessary in work which involves the measurement of the velocity of a flowing fluid, such as in a wind tunnel or in a pipe carrying a liquid, to measure two physical conditions existent; namely, the static pressure and the dynamic pressure. Utilizing these two measurements, the velocity of the fluid can be determined in a known fashion, and accordingly, if a high degree of accuracy is desired, it is extremely necessary that the measured pressures be accurate. The main difficulty in measuring pressures of a dynamic and static nature revolves about the knowledge of the flow direction, for it is obvious that the dynamic probe must be oriented normal to the flow and the static probe oriented to avoid any dynamic component and yet from a practical standpoint, varying conditions will be encountered such as variable flow direction. It will be apparent that if the probe is not oriented properly with respect to the flow direction at the time the measurement is taken, then the reading will be erroneous not only from the static standpoint but also from the dynamic standpoint.

It is accordingly the primary object of the invention to provide a static pressure probe which will indicate the same value of pressure when placed in a flowing fluid regardless of the orientation between the probe sensing element and the flow direction.

A further object of the invention is to provide a static probe which is simple in design and which can be manufactured readily by known techniques.

A still further object of the invention is to provide a static probe which is shaped so that it has symmetry in two or more planes.

With these and other objects in view, the invention consists of certain novel features of construction as will be more fully described and particularly pointed out in the appended claims.

In the accompanying drawings:

FIGURE 1 is a view of a preferred form of omni-directional probe partly in section;

FIGURE 2 is an elevational view of the probe of FIG. 1 on a reduced scale; and

FIGURES 3, 4, 5 and 6 are perspective views of alternate forms of probes which are symmetrical about one plane.

In proceeding with this invention, the principle of operation can be generally described as the ability to measure the pressure inside of a hollow body which has two or more holes within the shell thereof and means communicating from the interior of the shell to the exterior thereof and thence to a measuring instrument. The holes placed within the wall of the hollow body should be spaced so that they are symmetrical with respect to at least one geometric axis. Should the symmetry be extended into two or more planes, the shape of the hollow body will change and will become a sphere, such as illustrated in FIGURES 1 and 2.

Referring now to the drawings, there is shown in FIG. 1 a static probe which is symmetrical about two or more planes and which is useful in the ultimate case where the flow direction is unknown and fluctuates in an unknown plane or in more than one plane. To this end, the probe is provided with a tubular conduit 10 which is sometimes called a "sting" which conduit is made of sufficient diameter and rigidity so that it will successfully mount the probe body extending therefrom in a proper manner within the fluid to be measured. Extending from the tubular conduit 10 is a smaller conduit 11 which passes through the central portion of a sphere 12 entering the sphere on a diameter thereof through an aperture 13 at one end and leaving through an aperture 14 at the other side thereof. The end of this conduit 11 is plugged by a rod 15 having a reduced end 16 that enters the bore of the conduit 11. Within the interior of the probe 12 and surrounding the conduit 11 is a baffle cylinder 17 which is mounted in spaced relationship to the conduit 11 in the following manner. The baffle cylinder 17 is received within the apertures 13 and 14 and is flush with the exterior surface of the sphere 12. Then located within the bore of the baffle cylinder 17 is a cylindrical gasket 18 which is located at each end of the baffle cylinder 17, the gasket 18 receiving and snugly gripping the conduit 11.

The hollow shape 12 has through the wall thereof a plurality of holes or passageways 20. These holes are formed in the shell 12 when the shell body itself is a non-porous material and consist of a plurality of holes which are geometrically arranged in a particular pattern. The geometrical pattern chosen for illustration is best shown in FIG. 2 wherein five holes are spaced 72° apart from each other on both meridans of the sphere. Progressing around the sphere from the point 25 viewed in FIG. 2 are additional holes each spaced from those shown another 72° yielding a total number of twenty holes in the example shown. It should however be pointed out that the number of holes is not critical for the number merely results in a degree of accuracy for the probe in use, the main criteria being that there be sufficient holes to secure the proper accuracy desired. The accuracy can best be visualized by assuming that as one moves around the sphere in any diameter thereof, there will be a pressure variation occurring for this variable angle of attack that can be diagrammatically represented as a sinusoidal curve which will have more cycles for a 360° sweep of the sphere as the number of holes in the sphere is increased, thus giving a more constant pressure as one moves around the probe. The ultimate design, of course, such as ceramic or sintered metal, where an infinite number of holes or apertures 20 would be found therein.

Accordingly, with the probe in position in a fluid conduit, the fluid will enter into the interior of the sphere 12 where it will have little or no turbulence and the pressure within the sphere will be transmitted through apertures 21, 22 which are located in the tubular member 17 and near the ends thereof and adjacent the interior surface of the sphere 12. Offset from the placement of the apertures 21 and 22, are one or more apertures 23 which communicate with the interior of the string or conduit 10 through the conduit 11. It will be seen that by this particular placement of holes and the orientation thereof relative one to another in the conduit 11 and 17 that likelihood of any turbulence that might develop within the interior of the sphere 12 is practically eliminated and can be described as being a baffling method. Accordingly, the result obtained by using a probe such as described herein can be improved by changing the baffling within the body still further to reduce the effect of the fluid velocity that might occur within the interior of the sphere 12.

It might be mentioned at this point that what is actually measured within the interior of the sphere 12 is not a true static pressure but really can be thought to be a pressure which is measured regardless of the angle of attack towards the sphere 12. Accordingly, each probe must be calibrated by utilizing what is termed in the trade a total pressure probe, and then the calibration factor K can be determined experimentally in controlled conditions, the calibration factor K being found by the following formula:

$$K = \frac{P_s - P_p}{P_t - P_s}$$

where $P_s$ is the static pressure (true)
$P_p$ is the probe pressure (measured)
$P_t$ is the total pressure (true)

Accordingly, once K is found and the probe is used in a condition where the direction of the fluid flow is unknown, all one has to do is to measure the probe pressure which modified by the calibration factor can be used in the normal formulas to determine the velocity of the fluid. Thus, the total pressure measured by the probe together with either the total pressure, stagnation pressure, true static pressure or the pressure measured by another such probe with a different calibration constant may be used to determine the velocity of fluid flowing around the sensing element.

Mention has been made in the example of FIGURES 1 and 2 that in effect there is a symmetrical probe shown which is good for any angle of attack. However, one must realize that the conduit 11 does set up some unsymmetrical patterns around the probe and therefore to improve this particular characteristic, if one desires a high degree of accuracy, in the example shown in FIGURE 6, it will be necessary to add a number of rods extending perpendicular to the surface of the sphere at locations which would correspond to point 25 in FIG. 2 which in the example shown would mean the addition of six such projections.

Turning now to FIGURES 3 to 5, there is shown other geometrical shapes which utilize the same general principle and would similarly have the same internal construction as that shown in connection with FIGURES 1 and 2. For this reason, only the exterior shape is shown and it is of course pointed out that in these cases there is only one axis of symmetry, the flow direction shown by the arrows being the primary flow direction orientation. It will of course be appreciated that in FIG. 3 there is symmetry as long as the angle of attack of the flow varies within the plane that passes through the center of the conical shapes 30, which plane is represented in phantom and designated by the numeral 31. A similar situation exists for the cylindrical shape 34 as shown in FIG. 5 where the flow direction is basically at right angles to the surface of the cylinder 34, symmetry here being found within the plane represented in phantom by the numeral 35. A similar situation exists in FIG. 4 where the developed ellipse 32 may be utilized for the hollow body, the plane represented by the numeral 33 being the axis of symmetry.

It will accordingly be seen that there is disclosed herein a probe which in the spherical embodiment of FIGS. 1 and 2 averages pressure over the whole surface of the body and transmits it with a zero flow component to a measuring conduit that leads to a gage or other measuring device. In certain other embodiments we find rather than a multiple planal symmetry, single planal symmetry, but in the same case the pressure is averaged over the surface of the hollow body in this planal symmetry.

I claim:

1. A pressure probe comprising a symmetrical hollow body, conduit means communicating with the interior of said body, baffling means located between the outer wall of said conduit and the inner wall of said body, said baffling means consisting of a cylinder surrounding the outer wall of the conduit, openings in the wall of the conduit, said cylinder having ports therein which are out of registry with the openings in the conduit wall, said body having through the wall thereof a plurality of apertures, said apertures being arranged to give at least single, planal symmetry around the geometric shape of said body.

2. A probe as in claim 1 wherein said hollow body is substantially a sphere and said apertures are symmetrically arranged with respect to both meridians of the body and rods rise from the exterior of the body on a perpendicular thereto at points central of adjacent apertures.

References Cited in the file of this patent

UNITED STATES PATENTS

| | | |
|---|---|---|
| 2,101,858 | Knisley | Dec. 14, 1937 |
| 2,445,335 | Philbrick et al. | July 20, 1948 |
| 2,492,371 | Sivian | Dec. 27, 1949 |
| 2,923,152 | Mabry et al. | Feb. 2, 1960 |

FOREIGN PATENTS

| | | |
|---|---|---|
| 1,127,110 | France | Dec. 10, 1956 |